June 25, 1957  D. C. ROGERS ET AL  2,797,360
TRAVELLING WAVE AMPLIFIERS
Filed Feb. 2, 1954  3 Sheets-Sheet 1
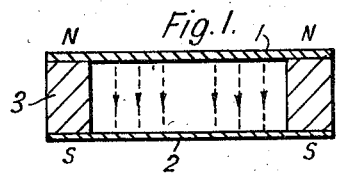
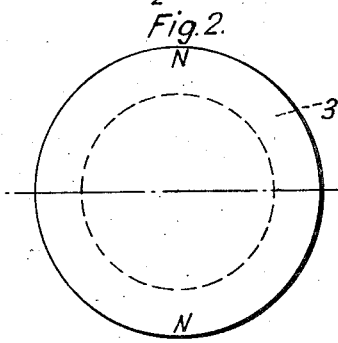
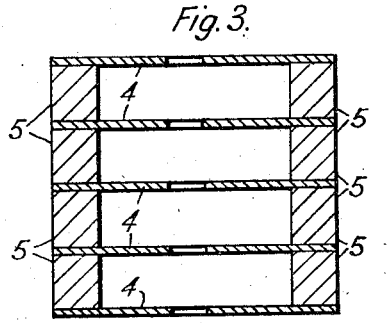
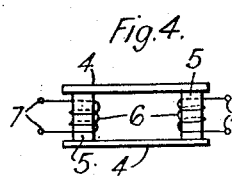 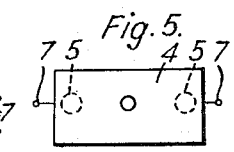 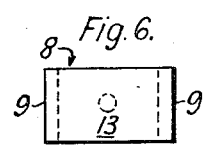
Inventors
D. C. ROGERS-
C. C. EAGLESFIELD
By *R P Morris*
Attorney

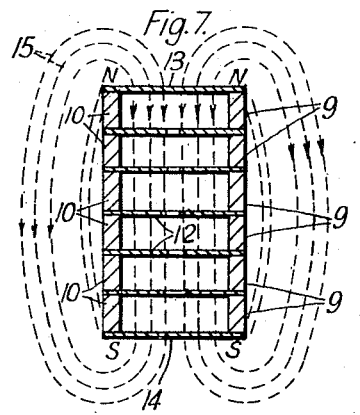
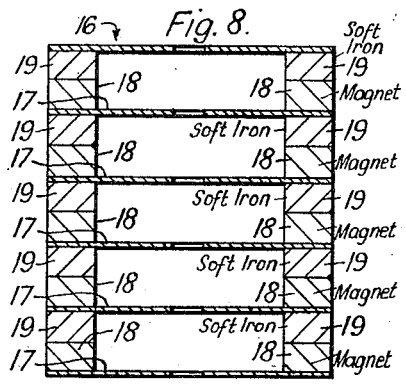
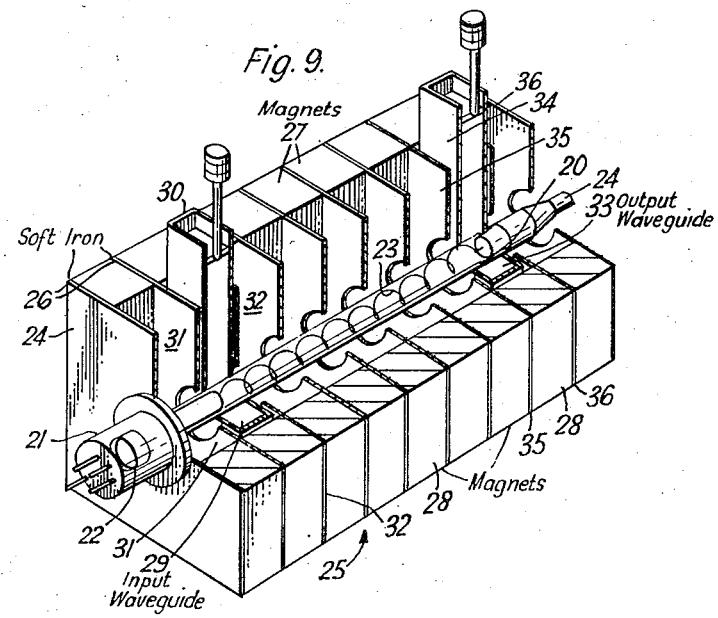

June 25, 1957  D. C. ROGERS ET AL  2,797,360
TRAVELLING WAVE AMPLIFIERS
Filed Feb. 2, 1954  3 Sheets-Sheet 3

Inventors
D. C. ROGERS
C. C. EAGLESFIELD
By R. P. Morris
Attorney

United States Patent Office 2,797,360
Patented June 25, 1957

2,797,360

TRAVELLING WAVE AMPLIFIERS

Douglas Cecil Rogers and Charles Cecil Eaglesfield, London, England, assignors to International Standard Electric Corporation, New York, N. Y.

Application February 2, 1954, Serial No. 407,762

Claims priority, application Great Britain March 26, 1953

7 Claims. (Cl. 315—39.3)

The present invention relates to magnet assemblies of the kind in which a substantially rectilinear magnetic field is produced along an axis whose length is large compared to the cross-sectional dimensions of the assembly. The invention, though not limited thereto, is of particular value in the field of travelling-wave apparatus and embodiments of the invention may form the basis of circuit units for travelling-wave tubes.

The travelling-wave tube is a device in which a beam of electrons is projected along an axis to interact with electromagnetic waves propagated with slow phase velocity by a delay line waveguide structure, for example a helix, normally within the tube envelope. Usually the device is used as an amplifier, but can, in certain forms, be used as an oscillator or other device whose operation, at lower frequencies, would depend upon the amplifying or rectifying properties of thermionic valves. For focussing the electron beam an axial magnetic field is required, while means must also be provided for coupling the said delay line waveguide to at least an output transmission path—usually a length of rectangular waveguide terminating in a waveguide flange for connection to other apparatus. A unitary construction of apparatus, minus the tube, comprising a beam focussing magnet assembly, at least a said output transmission path, and means for mounting the travelling-wave tube we call a "circuit unit."

Circuit units for travelling-wave tubes have, heretofore, usually employed an assembly of solenoids with lengths of rectangular wave guide mounted between solenoids to provide input and output transmission paths. The travelling-wave tube is mounted along the axis of the assembly of solenoids. The circuit unit is of necessity bulky and of considerable weight, while ancillary power supplies are needed to feed the solenoids.

It is an object of the present invention to provide a magnet assembly which provides in a somewhat smaller size and weight, an assembly suitable for use in a circuit unit for a travelling-wave tube.

It is a further object of the invention to provide a magnet assembly for producing a rectilinear magnetic field such as required in a travelling-wave circuit unit, utilizing permanent magnets.

According to the present invention there is provided a magnet assembly of magnetic cells stacked in series along a common axis, each said cell comprising a pair of parallel plates of material of high magnetic permeability and low reluctance and at least one permanent or electromagnet between them arranged, together if desired, with additional spacing members of low reluctance material, to provide a substantially rectilinear magnetic field along the said axis.

As applied to a preferred embodiment of the invention in a circuit unit for a travelling-wave tube, there is provided a circuit unit for a travelling-wave tube comprising a magnet assembly built up as a stack of magnetic cells in series, each said cell comprising, on each of two opposite sides of the assembly, a rectangular bar of magnet material permanently magnetised at right angles to its length and parallel to the longitudinal axis of the assembly, the two magnets being clamped between a pair of centrally apertured plates of low reluctance material transverse the said axis with, if desired, intervening spacing members of low reluctance material having similar dimensions at right angles to the said axis, the separation between opposite ferromagnetic members of the cell being at least equal to the length of the cell along the said axis; input and output waveguide coupling means inserted between the plates of respective said cells for providing electromagnetic coupling with a travelling-wave tube mounted along the said axis; and means for mounting the said travelling-wave tube within the magnet assembly.

Embodiments of the invention will be described with reference to the accompanying drawings in which:

Figs. 1 and 2 illustrate the principle of the magnetic cell used in the present invention;

Fig. 3 shows a plurality of magnetic cells, each similar to that of Figs. 1 and 2, stacked to form a magnet assembly according to the present invention;

Figs. 4 and 5 show modified forms of magnetic cells for use with the invention;

Figs. 6 and 7 show, respectively, plan and sectionalised elevational views of another form of assembly according to the invention;

Fig. 8 shows a further alternative method of assembly and construction of magnetic cells;

Fig. 9 shows, diagrammatically, a cut-away perspective view of travelling-wave apparatus incorporating the invention.

Figure 10:
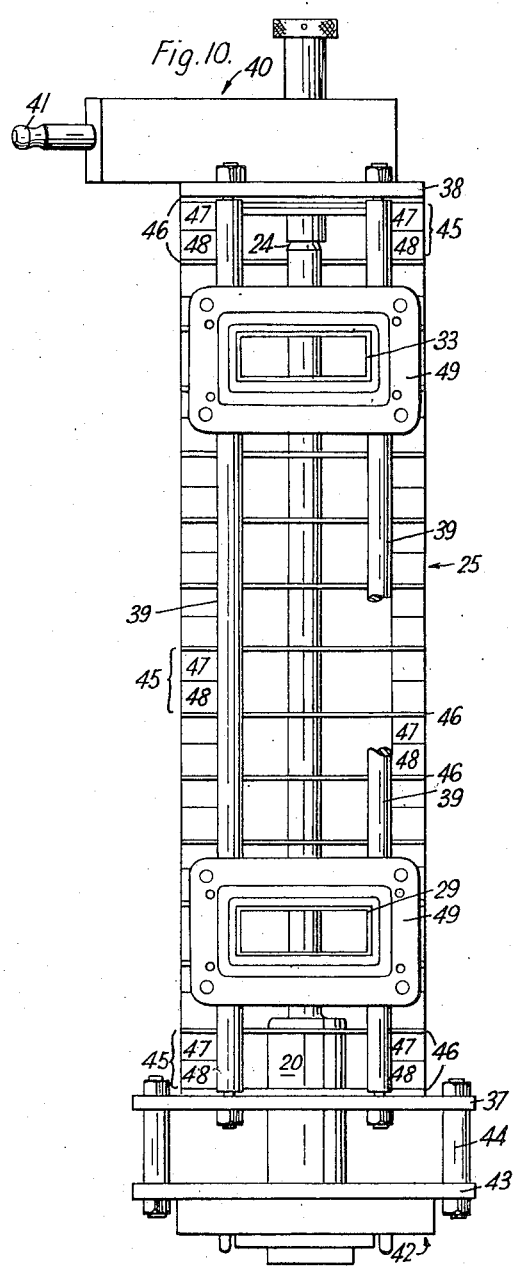
Fig. 10 shows the structure of a practical embodiment of the apparatus of Fig. 9.

The principle on which the invention is based can be appreciated from consideration of Figs. 1 and 2, which shows a magnetic "cell" comprising a pair of parallel circular laminae 1 and 2, each of a material of low reluctance, such as soft iron, forming end-caps for a hollow cylindrical member magnet 3 having opposite poles on its respective ends. There is thus a magnetic potential difference between the laminae 1, 2, which, on account of their high permeability, behave as equipotential surfaces; the magnetic field between them is indicated by the dotted lines in Fig. 1, being straight and perpendicular to their surfaces, particularly in the vicinity of the axis. Away from the axis, near to the magnet 3, there may be distortion of the field due to irregularities in the properties of the magnetic material, but these will not extend to the centre. The area of uniformity around the centre region is enlarged by making the axial length of the magnetic cell smaller than its cross-sectional dimensions. For a reasonable area of uniformity such as required in embodiments to be described, the internal diameter of cylinder 3 is at least equal to, but preferably not less than twice the spacing between laminae 1 and 2. The presence of the discs also prevents distortion of the field by external ferromagnetic objects, or stray magnetic fields.

Fig. 3 shows a plurality of the "cells" of Fig. 1 obtained by forming a pile of centrally apertured soft iron plates 4 and cylindrical magnets 5, arranged alternately. It will be seen that, provided the strengths of each of the magnets are equal and that they are magnetised in the same sense, the field impinging on the two sides of each inner plate is the same. Were the end plates not apertured, a small hole might therefore be cut in each disc without in any way disturbing the field. To allow access to the input field within the assembly, the end plates must, normally, also be apertured. This will tend to upset the uniformity of the field near the ends of the assembly, but provided the end apertures are small, the field distortion is not large and inside the assembly, this can be corrected by suitable gradiation of the strength of the individual magnets.

It should be noted that the individual magnets need not be of hollow circular cross-section; any cross-sectional shape may be used provided the magnetic material is kept at a sufficient distance from the region where it is desired to form the uniform field—preferably, as mentioned above, this distance should exceed the spacing between the laminae and, still better, should be at least twice the spacing. Figs. 4 and 5 show a cell having plates 4 of soft iron with two electromagnets 5 of circular cross-section energised by the coils 6 connected to terminals 7.

In Figs. 6 and 7 a magnetic assembly 8 is shown comprising two sets of permanent magnets 9 and 10 of rectangular section magnetised at right angles to their lengths and arranged in pairs to either side of the assembly, being separated by rectangular plates 12. The end plates 13 and 14 of the assembly are shown free from any aperture so that the magnetic field is strictly uniform within the enclosure of the assembly, in spite of central apertures in the plates intermediate the ends of the assembly. The lines of magnetic source inside and outside the assembly are indicated by the dotted lines 15.

It is apparent that the arrangement of Figs. 6 and 7 can provide a rectilinear field of any required length by stacking together a sufficient number of elementary magnetic cells; the design of the individual cells, however, will, in general, be chosen to suit the required length, taking into account the variation of leakage flux, external to the assembly, along the length of the assembly. The total leakage flux is considerably greater, in any practical system, than the useful flux about the axis within the assembly. The leakage flux, therefore, is the controlling factor in the design of the magnet system, and, as stated above, the design of individual magnetic cells will vary according to the desired length of the magnet assembly. Although, except for the end plates of the assembly, which should be made thicker than the intermediate plates, we prefer to make the individual cells identical in dimensions and degree of magnetisation, it is possible to grade the magnetic properties of the cells to achieve the desired degree of uniformity of field along the axis of the assembly. Again, with a given magnet material we may adjust the strength of the cells by only partially magnetising the material or may reduce the thickness, between plates, of the permanent magnets and add spacing members of soft iron. This is illustrated in Fig. 8.

In Fig. 8 a magnet assembly 16 is made up of low reluctance plates 17 between adjacent ones of which are clamped pairs of magnets 18 and slightly thicker soft iron spacing members 19.

One of the most valuable fields of application of the invention is the focussing of long electron beams with substantially constant cross-section as, for example, in a circuit unit for a travelling wave tube. A general arrangement of such an embodiment is shown diagrammatically in Fig. 9, in which a travelling-wave tube is represented at 20, containing within a glass envelope 21 an electron gun 22, and a helix 23, an electron collector electrode 24 being sealed to the other end.

A magnetic assembly 25, similar to arrangements described above, surrounds the travelling-wave tube between the electron gun and the collector electrode. The assembly 25 comprises a plurality of centrally apertured soft-iron plates 26 and two sets of permanent magnets 27, 28, respectively, positioned on opposite sides of the assembly arranged similarly to the arrangement of Figs. 6 and 7. High frequency energy is fed into the helix 23 via the input waveguide 29, from which a tuning extension 30 is shown projecting between two adjacent plates 31 and 32. Similarly an output waveguide 33 together with its tuning extension 34 is shown passing through the assembly 25 between plates 35 and 36.

A plan view, as seen from underneath Fig. 9, but relating to an actual construction of the travelling-wave tube apparatus, is shown in Fig. 10. The magnetic assembly 25 is held together between end plates 37 and 38, respectively, by means of four tie rods 39, of which two are visible in the drawing. To the right of end plate 37 an assembly 40, secured to the plate, comprises locating and forced air cooling arrangements for the collector electrode 24 of the travelling-wave tube 20, air being admitted through the nozzle 41. At the other end of the magnet assembly both D. C. connection and alignment means for the travelling-wave tube are provided by a base support assembly 42. The base support assembly 42 comprises a valve holder receiving the connection pins on the base of the travelling-wave tube together with appropriate centring means for aligning the axis of the tube with the axis of the assembly 25. The assembly 42 is secured to a mounting plate 43, fixed to the end plate 37, by means of bolts and spacing washers 44, and includes means whereby the tube 20 may readily be inserted or extracted from the apparatus.

The magnetic elements of the assembly 25 are arranged in similar manner to that described with reference to Fig. 8 and in the embodiment illustrated in Fig. 10, comprises an assemblage of fourteen individual cells such as 45, each comprising soft iron plates 46 apertured to receive the envelope of the tube 20, a pair of magnets 47 and a pair of soft iron spacing members 48. Input and output waveguide connections 29 and 33, respectively, are mounted on the tie rods 39 and are provided with coupling flanges 49, visible in Fig. 10, on one side of the assembly and piston matching arrangements such as depicted at 30 and 34, Fig. 9, on the other side. The separation between the soft iron plates 45 is chosen so as to provide ample clearance between adjacent plates for the waveguides.

In the construction to which Fig. 10 relates, the plates 46 where of square section $\frac{1}{16}$ of an inch thick and having a central hole 1.350 inches in diameter. The magnets 47 each comprised bars of rectangular section $\frac{1}{2}$ inch x $\frac{3}{4}$ inch and $3\frac{1}{2}$ inches long, the smallest dimension being arranged parallel to the axis of the magnet assembly 26. The spacing members 48, of soft iron, were of the same length and width, perpendicular to the axis of the assembly, but were $\frac{7}{16}$ of an inch thick (parallel to the axis of the assembly).

The magnets 47 were made of a material known to the trade as "Alcomax" III, which is stated to have the following properties:

Remanence_____ 12,200 gauss.
Coercive force_____ 650 oersted.
Energy product_____ 4.75 magagauss$\times$oersted.

With the magnet material fully magnetised a useful field of greater than 40 gauss was obtained. The field varies by 10% from end to end of this length, there being a drop in strength towards the middle.

With the magnet material only partially magnetised an axial field of 290–320 gauss was obtained along the same length.

Direct measurement of departure from rectilinearity of the field could not readily be measured, but that it was very small can be judged from the following figures. A travelling-wave tube having a non-magnetic helix 0.093 inch in diameter and $8\frac{3}{4}$ inches long was inserted in the circuit. An electron current of 4.1 ma. was drawn from the planar cathode of the tube, the cathode diameter being 0.06 inch, and was accelerated to a potential of 1500 volts. The collector current was found to be 4.0 ma.

While the principles of the invention have been described above in connection with specific embodiments, and particular modifications thereof, it is to be clearly understood that this description is made only by way of example and not as a limitation on the scope of the invention.

What we claim is:

1. A magnet assembly of magnetic cells stacked in contiguous series along a common axis, each said cell comprising a pair of parallel plates of material of high magnetic permeability and low reluctance and at least one magnet between them, said magnets being similarly oriented to provide a substantially rectilinear magnetic field along the said axis.

2. A magnet assembly according to claim 1, in which the magnets for each said cell are spaced from the said axis a distance at least equal to separation between the said plates at opposite ends of the cell.

3. A magnet assembly according to claim 2, in which the said plates intermediate the ends of the assembly are apertured to permit an elongated article to lie along the said axis within the assembly.

4. A magnet assembly according to claim 1 in which the said magnets are annular and surround the said axis.

5. A magnet assembly according to claim 1 in which each said cell comprises two bar magnets, symmetrically mounted on opposite sides of the said axis.

6. A magnet assembly according to claim 5 in which the plates of each cell are rectangular and are spaced apart on each said opposite side of the said axis by a permanent magnet and a spacing member of low reluctance material, both of rectangular cross-section, placed side by side parallel to the axis.

7. A circuit unit for a travelling-wave tube comprising a magnet assembly built up as a stack of magnetic cells in series, each said cell comprising, on each of two opposite sides of the assembly, a rectangular bar of magnet material permanently magnetised at right angles to its length and parallel to the longitudinal axis of the assembly, the two magnets being clamped between a pair of centrally apertured plates of low reluctance material transverse the said axis with intervening spacing members of low reluctance material having dimensions similar to said magnets at right angles to the said axis, the separation between opposite ferromagnetic members of the cell being at least equal to the length of the cell along the said axis; input and output waveguide coupling means inserted between the plates of respective said cells for providing electromagnetic coupling with a travelling-wave tube mounted at spaced points along the said axis; and means for mounting a traveling-wave tube within the magnet assembly.

References Cited in the file of this patent

UNITED STATES PATENTS

| | | |
|---|---|---|
| 2,200,039 | Nicoll | May 7, 1940 |
| 2,259,531 | Miller et al. | Oct. 21, 1941 |
| 2,300,052 | Lindenblad | Oct. 27, 1942 |
| 2,305,884 | Litton | Dec. 22, 1942 |
| 2,640,162 | Espenchied et al. | May 26, 1953 |